US011799397B2

(12) United States Patent
Burhanettin (10) Patent No.: US 11,799,397 B2
(45) Date of Patent: Oct. 24, 2023

(54) INERTIA DRIVE MOTOR AND METHOD FOR CONTROLLING SUCH MOTOR

(71) Applicant: Physik Instrumente (PI) GmbH & Co. KG, Karlsruhe (DE)

(72) Inventor: Koc Burhanettin, Ettlingen (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 56 days.

(21) Appl. No.: 17/618,221

(22) PCT Filed: Jun. 10, 2020

(86) PCT No.: PCT/EP2020/066122
§ 371 (c)(1),
(2) Date: Dec. 10, 2021

(87) PCT Pub. No.: WO2020/249632
PCT Pub. Date: Dec. 17, 2020

(65) Prior Publication Data
US 2022/0255467 A1    Aug. 11, 2022

(30) Foreign Application Priority Data

Jun. 13, 2019  (EP) .................... 19180082

(51) Int. Cl.
*H02N 2/02* (2006.01)
*H02N 2/00* (2006.01)

(52) U.S. Cl.
CPC .......... *H02N 2/025* (2013.01); *H02N 2/0025* (2013.01); *H02N 2/0065* (2013.01); *H02N 2/0075* (2013.01)

(58) Field of Classification Search
CPC .... H02N 2/025; H02N 2/0025; H02N 2/0065; H02N 2/0075
See application file for complete search history.

(56) References Cited

U.S. PATENT DOCUMENTS 5,593,033 A    1/1997  Kunreuther
6,703,762 B1 *  3/2004  Okada ................ H02N 2/067
                                                        310/317
(Continued)

FOREIGN PATENT DOCUMENTS

CN    106100435 A    11/2016
EP      3089348 A1    11/2016
(Continued)

OTHER PUBLICATIONS

International Search Report (PCT/ISA/210) with translation and Written Opinion (PCT/ISA/237) dated Sep. 1, 2020, by the European Patent Office as the International Searching Authority for International Application No. PCT/EP2020/066122.
(Continued)

*Primary Examiner* — Emily P Pham
(74) *Attorney, Agent, or Firm* — BUCHANAN INGERSOLL & ROONEY PC (57) ABSTRACT

An inertia drive motor is disclosed which includes an element to be driven, and a stator, the stator having: an elastic frame, at least one friction element arranged on the elastic frame and configured to be brought into frictional contact with the element to be driven, and a first electromechanical actuator and a second electromechanical actuator, which are configured to cause, by interaction, a deformation of the elastic frame, upon excitation with different excitation voltages having a sawtooth signal, so as to displace the at least one friction element for driving the element to be driven by stick-slip contact with the friction element.

20 Claims, 7 Drawing Sheets (56) References Cited

U.S. PATENT DOCUMENTS

| | | | |
|---|---|---|---|
| 10,177,686 B2 | 1/2019 | Koc | |
| 10,326,383 B2 * | 6/2019 | Stiebel | H02N 2/0075 |
| 2012/0267983 A1 | 10/2012 | Ho et al. | |
| 2013/0162104 A1 | 6/2013 | Masuda et al. | |
| 2016/0329835 A1 | 11/2016 | Koc | |

FOREIGN PATENT DOCUMENTS

| | | |
|---|---|---|
| JP | H08168274 A | 6/1996 |
| KR | 100759075 B1 | 9/2007 |
| WO | 2015113998 A1 | 8/2015 |

OTHER PUBLICATIONS

Pan et al., "Design and simulation of a 2-DOF parallel linear precision platform utilizing piezoelectric impact drive mechanism" Tenth International Symposium on Precision Engineering Measurements and Instrumentation, Aug. 8-10, 2018, Kunming, China; Proceedings of SPIE, vol. 11053, 110534B, Mar. 7, 2019, XP060116232.

Notification of the First Office Action dated Jul. 7, 2023, by the Chinese Patent Office in corresponding Chinese Patent Application No. 202080042789.0, and an English Translation of the Office Action. (18 pages).

Office Action (Communication) dated Jul. 18, 2023, by the European Patent Office in corresponding European Patent Application No. 19 180 082.0. (5 pages).

\* cited by examiner

INERTIA DRIVE MOTOR AND METHOD FOR CONTROLLING SUCH MOTOR

The present invention relates to an inertia drive motor and a method for controlling the inertia drive motor. In particular, the invention relates to an inertia drive motor which is configured to drive an element to be driven by stick-slip effect.

Such inertia drive motors are known from the prior art. U.S. Pat. No. 5,593,033 B2 discloses a stick-slip piezo motor comprising two piezo elements, which are connected to a common holding element. Each piezo element is provided with a friction element at its end. Accordingly, each piezo element is configured to displace its corresponding friction element upon excitation with an excitation voltage signal.

EP 3 089 348 B1 discloses a piezoelectric motor comprising two piezoelectric actuators which are coupled by two elastic elements. The elastic elements are displaced upon excitation of the piezoelectric actuators with the same excitation voltage signal. In order to achieve the desired stick-slip drive of an element to be driven, the piezoelectric actuators differ in their polarization direction, so as to expand and contract oppositely to each other. It is deemed disadvantageous that different piezoelectric actuators are required, as this increases production complexity and costs.

Therefore, it is an object of the present invention to provide an inertia drive motor, which requires a smaller number of different parts, thereby reducing production complexity and costs.

This object is solved by an inertia drive motor comprising: an element to be driven, and a stator, the stator comprising: an elastic frame, at least one friction element arranged on the elastic frame and configured to be brought into frictional contact with the element to be driven, and a first electromechanical and preferably piezoelectric actuator and a second electromechanical and preferably piezoelectric actuator, which are configured to cause, by interaction, a deformation of the elastic frame, upon excitation with different excitation voltages having a sawtooth signal, so as to displace the at least one friction element for driving the element to be driven by stick-slip contact with said friction element. According to this configuration, identical electromechanical actuators can be used in the inertia drive motor.

Advantageous further developments are the subject matters of the dependent claims.

It may be useful when the excitation voltage signal of the first electromechanical actuator is a first excitation voltage signal and the excitation voltage signal of the second electromechanical actuator is a second excitation voltage signal, and the first excitation voltage signal and the second excitation voltage signal are mirrored to each other.

It may be advantageous when a decrease of the second excitation voltage signal between its maximum voltage level and its minimum voltage level is the negative gradient of an increase of the first excitation voltage signal between its minimum voltage level and its maximum voltage level and/or wherein a decrease of the first excitation voltage signal between its maximum voltage level and its minimum voltage level is the negative gradient of an increase of the second excitation voltage signal between its minimum voltage level and its maximum voltage level.

It may prove to be convenient when the first excitation voltage signal has its maximum voltage level at a time at which the second excitation voltage signal has its minimum voltage level and/or wherein the first excitation voltage signal has its minimum voltage level at a time at which the second excitation voltage signal has its maximum voltage level. With such excitation voltage signals, the contraction and expansion of both electromechanical actuators can be coordinated most efficiently so as to optimize the driving movement imparted to the element to be driven.

It may also be useful when the first electromechanical actuator and the second electromechanical actuator are identical to each other in terms of structure and/or polarization and/or orientation. This feature minimizes production efforts and costs, respectively.

It may be of advantage when the first electromechanical actuator and the second electromechanical actuator are configured to expand and contract along parallel vibration paths, which are perpendicular to the moving direction of the element to be driven. With such configuration, the expansion and contraction of the actuators can easily be converted into a reciprocating cyclic deformation of the elastic frame for driving the element to be driven.

It may be prove to be convenient when the at least one friction element is provided on a portion of the elastic frame, which is configured to incline with respect to the moving direction of the element to be driven upon excitation of the first electromechanical actuator and the second electromechanical actuator. The inclining portion of the elastic frame may serve as a rocker element driven by the expansion and contraction of the actuators for imparting the drive movement of the element to be driven by the rocking movement of the friction element.

It may be useful when a side of the elastic frame facing the element to be driven corresponds to a first side of the elastic frame and an opposite side of the elastic frame facing away from the element to be driven corresponds to a second side of the elastic frame, wherein two friction elements are arranged on the first side of the elastic frame, or wherein, in case another element to be driven is provided on the second side of the elastic frame, the same number of friction elements is arranged on each of the first side and the second side of the elastic frame, wherein preferably one or two friction elements are arranged on each of the first side and the second side of the elastic frame. With such configuration, two elements can be driven by one inertia drive motor.

It may be also useful when the first electromechanical actuator and the second electromechanical actuator are provided symmetrically with respect to a stator symmetry plane running through the at least one friction element, or passing in between two friction elements. This configuration enhances the precision of the drive movement of the element to be driven in both directions along the axis of movement.

It may be advantageous when the elastic frame comprises a first receptacle, in which the first electromechanical actuator is accommodated, and a second receptacle, in which the second electromechanical actuator is accommodated, wherein both receptacles preferably open to the same side of the elastic frame, wherein said same side is more preferably different from a side facing the element to be driven and different from a side facing away from the element to be driven. This design allows the actuators to be easily coupled with the elastic frame in friction fit and/or form fit manner. In order to secure the actuator in the respective receptacle, an adhesive connection also proves helpful.

It may, however, also be useful when the elastic frame comprises at least one further opening between the first receptacle and the second receptacle and/or the friction element, wherein preferably portions of the elastic frame surrounding the opening are configured as flexure hinges. Such design allows the elastic frame to effectively convert the expansion and contraction of the actuators into a drive movement of the friction element and finally the element to be driven.

It may be of advantage when the elastic frame comprises at least one and preferably a pair of set screws, which is respectively configured to adjust pretension of the first electromechanical actuator and the second electromechanical actuator against a portion of the elastic frame provided with the friction element. With such set screws, essential drive force parameters of the inertia drive motor can be easily adjusted.

Furthermore, it may be convenient when the at least one friction element is located between the first electromechanical actuator and the second electromechanical actuator along the moving direction of the element to be driven. With such configuration, the friction element may impart the highest possible drive power onto the element to be driven.

It may be useful when the inertia drive motor further comprises a control device, which is configured to generate the excitation voltage signals of the first electromechanical actuator and the second electromechanical actuator required for driving the element to be driven by stick-stick slip contact with the friction element. Due to the motor's own control unit, an external drive source is dispensable.

A further aspect of the invention relates to a method for controlling the inertia drive motor according to any one of the preceding embodiments by actuating said first and second electromechanical actuators, so as to interact, upon excitation with different excitation voltages having sawtooth signals which are preferably mirrored to each other, in order to cause deformation of the elastic frame, so as to displace the at least one friction element for driving the element to be driven by stick-slip contact with said friction element. In the method according to the claimed invention, the element to be driven is actually moved along its axis of movement by stick-slip-contact with the friction element of the stator. The same effects ensue as mentioned above in contact with claim 1.

Terms and Definitions

The stick-slip-effect denotes the stick-slip of bodies, which are relatively moved to each other, and is known from the prior art. In this case, the adjustment of the element to be driven along the stator by means of stick-slip-effect comprises a stick phase in which a frictional element of the stator is engaged with the element to be driven by means of static friction, and a slip phase in which the friction element moves relative to the element to be driven due to inertia effects.

The term electromechanical actuator denotes an actuator comprising or consisting of an electromechanical material that undergoes physical deformation upon application of an electrical voltage. Such electromechanical materials including especially piezoelectric and electrostrictive materials.

The interaction of the first and second electromechanical actuator upon excitation with different excitation voltages having a sawtooth signal denotes the interaction of said actuators when the first electromechanical actuator is excited by a first excitation voltage having a sawtooth signal during a certain time interval and the second electromechanical actuator is excited by a second excitation voltage having a sawtooth signal during the same time interval, wherein the second excitation voltage is different to the first excitation voltage.

BRIEF DESCRIPTIONS OF THE DRAWINGS

FIG. 1b shows a sectional view of the inertia drive motor of FIG. 1a.

DETAILED DESCRIPTION OF PREFERRED EMBODIMENTS

Figure 1A:
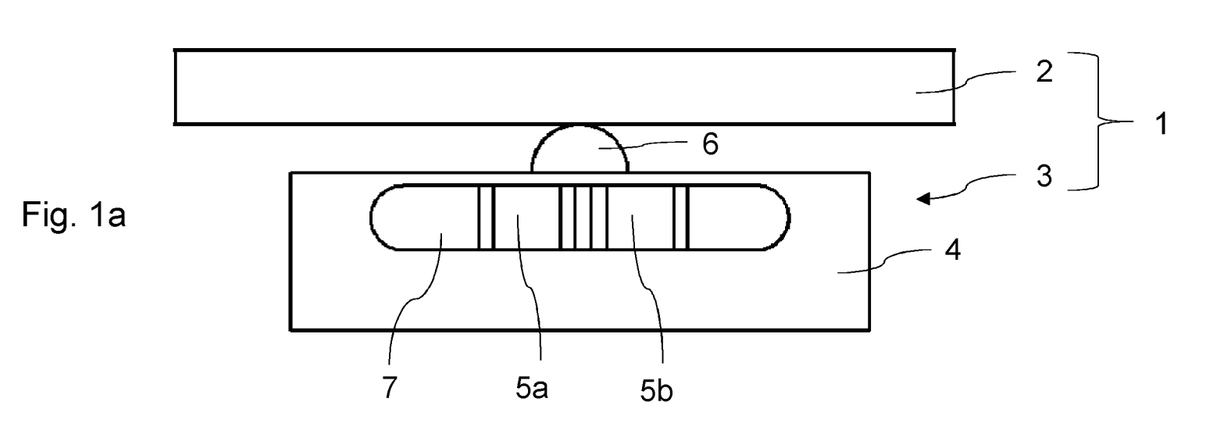
FIG. 1a shows a schematic side view of an inertia drive motor according to a first embodiment of the present invention.

A first embodiment of the inertia drive motor 1 is illustrated in FIG. 1a. The inertia drive motor 1 comprises an element to be driven 2 and a stator 3. The stator 3 includes an elastic frame 4, a first piezoelectric actuator 5a and a second piezoelectric actuator 5a accommodated in a receptacle 7 of the elastic frame 4, and a friction element 6 arranged on the elastic frame 4.

The elastic frame 4 has a plate-like shape. The receptacle 7 extends in the elastic frame 4 along its longitudinal direction and entirely penetrates the elastic frame 4 in its width direction. With respect to the height direction of the elastic frame 4, the receptacle 7 is located such that a thin portion of the elastic frame 4 is formed above the receptacle 7. The friction element 6 is arranged on an outer surface of said thin portion constituting a part of the upper side surface of the elastic frame 4 facing the element to be driven 2. In this embodiment, the friction element 6 has a half-spherical shape and is in contact with the element to be driven 2 via its spherical part, wherein the flat circular part of the friction element 6 is in contact with the elastic frame 4.

Within the receptacle 7, the first piezoelectric actuator 5a and the second piezoelectric actuator 5b are provided symmetrically with respect to a stator symmetry plane running through the friction element 6. Contact surfaces of each the first piezoelectric actuator 5a and the second piezoelectric actuator 5b, which are in contact with the elastic frame 4, are firmly bonded to the elastic frame 4, preferably by an adhesive. The first and second piezoelectric actuators 5a and 5b are identical actuators having the same polarization direction and the same shape and are accommodated in the receptacle 7 in the same orientation. Preferably the dimensions of the actuators 5a, 5b in a neutral (non-excited) state are slightly oversized compared to the dimensions of the receptacles 7, so that the actuators 5a, 5b have to be press-fit into the receptacles 7 and maintain firm contact with the elastic frame 4 defining the interior of the receptacles 7.

Figure 1B:
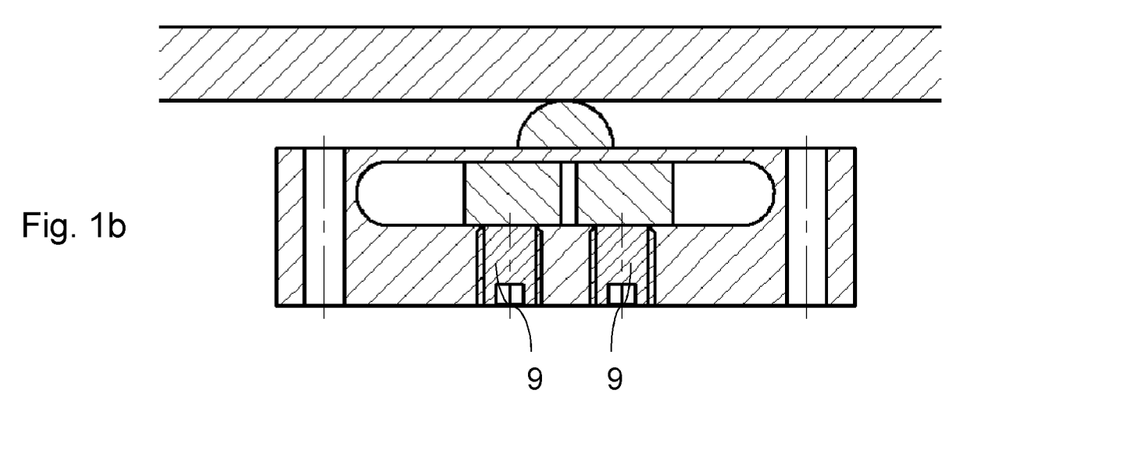

FIG. 1b is a sectional view of the inertia drive motor 1 shown in FIG. 1a. FIG. 1b shows two set screws 9, which are provided in the elastic frame 4. Each set screw 9 is configured to press one of the first piezoelectric actuator 5a and the second piezoelectric 5b actuator against the thin portion of the elastic frame 4. In this manner, pretension of the first piezoelectric actuator 5a and the second piezoelectric actuator 5b, which is necessary for suitable operation of said actuators, can be achieved. Further pretension of said actuators can be achieved by the pressing force of the element to be driven 2 against the friction element 6. In general, the relative arrangement of the element to be driven 2 and the stator 3 causing said pressing force is essential for an adequate operation of the inertia drive motor 1.

Figure 2A:
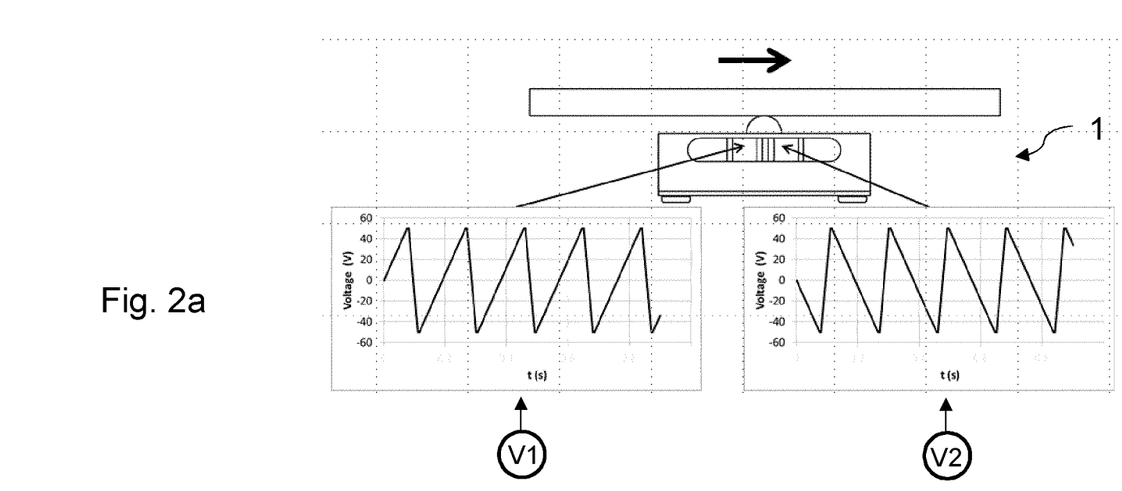
FIG. 2a shows excitation voltage signals which are applied to the piezoelectric actuators of the inertia drive motor of FIG. 1a in order to drive the element to be driven in a first direction.
Figure 2B:
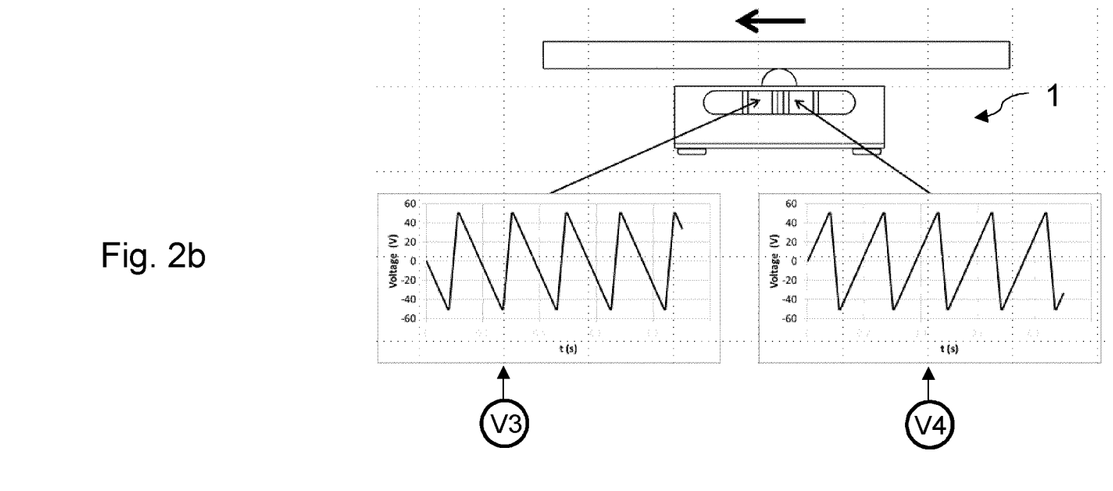
FIG. 2b shows excitation voltage signals which are applied to the piezoelectric actuators of the inertia drive motor of FIG. 1a in order to drive the element to be driven in a second direction.

Excitation voltage signals, which are applied to the first piezoelectric actuator 5a and the second piezoelectric actuator 5b by a control device, are illustrated in FIGS. 2a and 2b. Excitation of the first piezoelectric actuator 5a with the excitation voltage signal V1 and excitation of the second piezoelectric actuator 5b with the excitation voltage signal V2 leads to forward movement of the element to be driven 2 (i.e. the right direction in FIG. 2). The excitation voltage signals V1 and V2 are sawtooth signals, which are mirrored to each other. That is, a decrease of the second excitation voltage signal V2 between its maximum voltage level and its minimum voltage level is the negative gradient of an increase of the first excitation voltage signal V1 between its minimum voltage level and its maximum voltage level. Likewise, a decrease of the first excitation voltage signal V1 between its maximum voltage level and its minimum voltage level is the negative gradient of an increase of the second excitation voltage signal V2 between its minimum voltage level and its maximum voltage level. Furthermore, the first excitation voltage signal V1 has its maximum voltage level at a time at which the second excitation voltage signal V2 has its minimum voltage level. Similarly, the first excitation voltage signal V1 has its minimum voltage level at a time at which the second excitation voltage signal V2 has its maximum voltage level.

In this embodiment, the maximum voltage level of the first and second excitation voltage signals V1 and V2 is a positive voltage value and the minimum voltage level of the first and second excitation voltage signals V1 and V2 is a negative voltage value. It is to be noted that the excitation voltage signals V1 and V2 are not limited to sawtooth signals having a transition from a negative voltage value to a positive voltage value or the other way round. In general, the first and second piezoelectric actuator 5a and 5b can be also excited by excitation voltage signals which exclusively have positive or negative voltage values as long as the respective excitation voltage signals are mirrored to each other.

In FIG. 2b, the first piezoelectric actuator 5a is excited by the excitation voltage signal V3, which corresponds to the excitation voltage signal V2 shown in FIG. 2a. Furthermore, the second piezoelectric actuator 5b is excited by the excitation voltage signal V4, which corresponds to the excitation voltage signal V1 shown in FIG. 2a. This actuation leads to a rearward movement of the element to be driven 2 (i.e. the left direction in FIG. 2b).

Figure 3A:
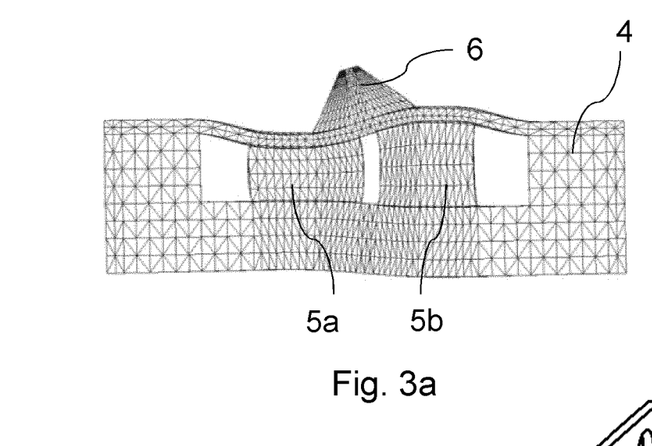
FIGS. 3a and 3b show calculated maximum deformation states of the elastic frame of the inertia drive motor according to the first embodiment upon excitation of the piezoelectric actuators.
Figure 3B:
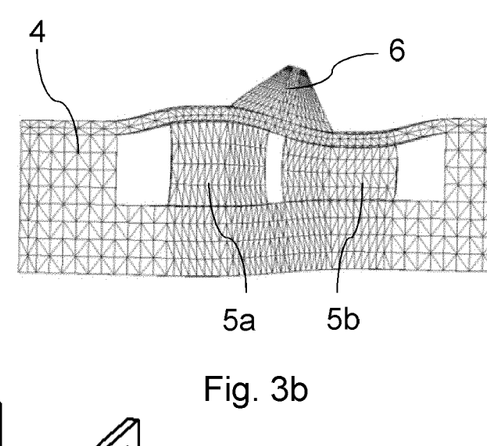

Deformations of the elastic frame 4 occurring during the afore-mentioned excitation of the first and second piezoelectric actuators 5a and 5b with the excitation voltage signals V1 and V2 or V3 and V4 are illustrated in FIGS. 3a and 3b. FIG. 3a shows a state, in which the first piezoelectric actuator 5a contracts and the second piezoelectric actuator 5b expands. Contraction and expansion of the first and second piezoelectric actuator 5a and 5b take place along parallel vibration paths, which are perpendicular to the moving direction of the element to be driven 2. Due to the inverse contraction and expansion of the first and second piezoelectric actuator 5a and 5b, the thin portion of the elastic frame 4, on which the friction element 6 is arranged, serves as a rocker and inclines with respect to the moving direction of the element to be driven 2.

Accordingly, the tip of the friction element 6 is displaced upon inclination of the thin portion. FIG. 3b shows a state, in which the first piezoelectric actuator 5a expands and the second piezoelectric actuator 5b contracts.

Alternating expansion and contraction of the first and second piezoelectric actuators 5a and 5b caused by the afore-mentioned excitation voltage signals V1 and V2 or V3 and V4 lead to movement of the element to be driven 2 due to the stick-slip effect. In particular, with respect to the excitation voltage signals V1 and V2, the slow increase of the excitation voltage signal V1 between its minimum voltage level and its maximum voltage level and the simultaneous slow decrease of the excitation voltage signal V2 between its maximum voltage level and its minimum voltage level lead to slow displacement of the tip of the friction element 6 in the moving direction of the element to be driven 2. Subsequently, the fast decrease of the excitation voltage signal V1 between its maximum voltage level and its minimum voltage level and the simultaneous fast increase of the excitation voltage signal V2 between its minimum voltage level and its maximum voltage level lead to a fast displacement of the tip of the friction element 6 in the direction opposite to the moving direction of the element to be driven 2. The slow displacement of the tip of the friction element 6 in the moving direction of the element to be driven 2 constitutes a stick phase, wherein the tip of the friction element 6 sticks to a friction surface of the element to be driven 2. During said stick phase, friction force applied by the tip of the friction element 6 to the element to be driven 2 pushes the element to be driven 2 in the moving direction. The fast displacement of the tip of the friction element 6 in the direction opposite to the moving direction of the element to be driven 2 constitutes a slip phase, wherein the tip of the friction element 6 slips along the friction surface of the element to be driven 2. During said slip phase, friction force applied by the tip of the friction element 6 to the element to be driven 2 is smaller than the inertia force of the element to be driven 2. Accordingly, the tip of the friction element 6 is displaced in the direction opposite to the moving direction of the element to be driven 2 without causing a movement of the element to be driven 2 in said opposite direction. Multiple repetitions of said slow and fast displacements of the tip of the friction element 6 lead to continuous movement of the element to be driven 2. An analogous drive concept is achieved by excitation of the first and second piezoelectric actuator 5a and 5b with the excitation voltage signals V3 and V4. However, as mentioned above, with this actuation, the element to be driven 2 moves in a rearward direction.

Figure 4:
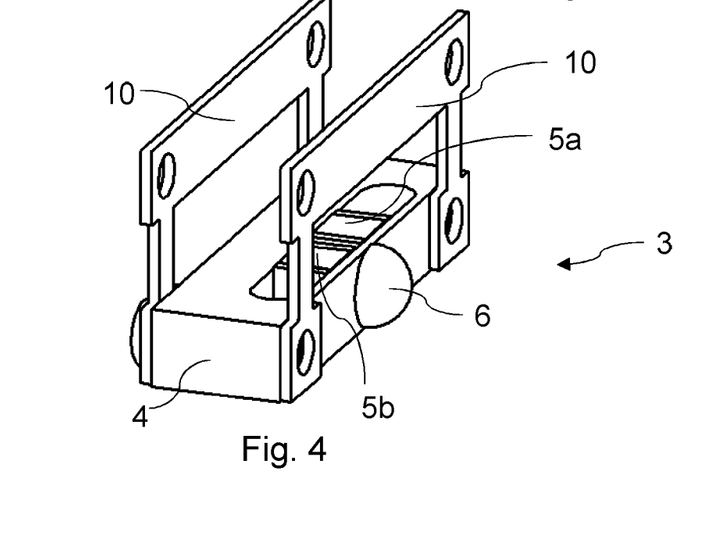
FIG. 4 shows a perspective view of the inertia drive motor of the first embodiment, wherein the elastic frame is provided with plate springs.

FIG. 4 shows the stator 3 of the inertia drive motor 1 of the first embodiment provided with two plate springs 10 carrying the elastic frame 4. The plate springs 10 are formed in a U-shape, wherein its legs are attached to the surface of the elastic frame 4 provided to face the element to be driven 2 and the opposite surface of the elastic frame 4 provided to face away from the element to be driven 2. In this manner, the plate springs 10 are oppositely arranged on the elastic frame 4 and configured to attach the stator 3 to a base structure, in order to position the stator 3 relatively to the element to be driven 2. For the purpose of attachment, the plate springs 10 are provided with through-holes.

Figure 5:
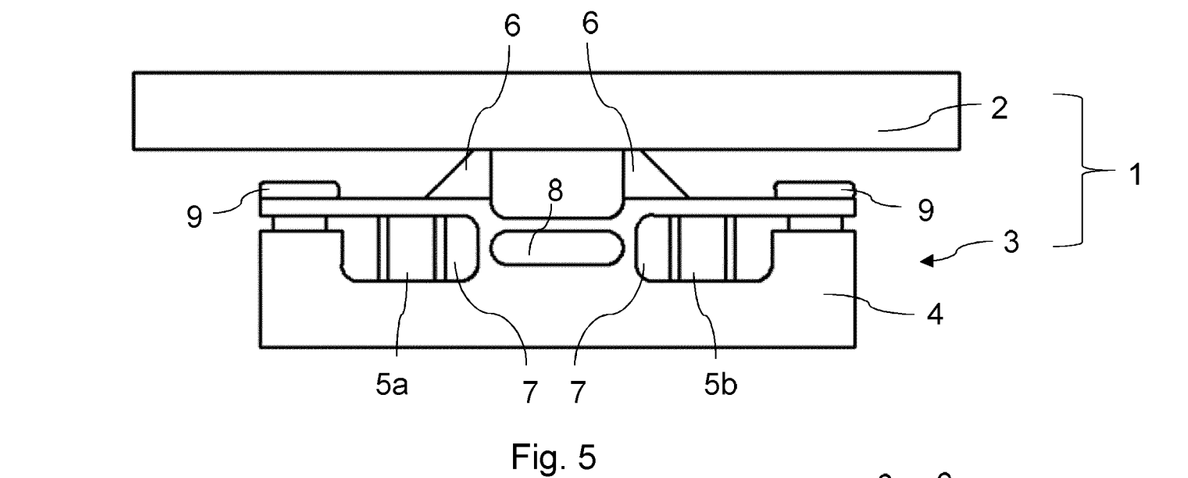
FIG. 5 shows an inertia drive motor according to a second embodiment of the present invention, wherein the stator has two friction elements.

A second embodiment of the inertia drive motor 1 is shown in FIG. 5. The second embodiment of the inertia drive motor 1 is substantially based on the first embodiment of the inertia drive motor 1 described above. Differences of the first and second embodiment are described in the following:

The inertia drive motor 1 according to the second embodiment comprises an elastic frame 4 having two receptacles 7. The first piezoelectric actuator 5a is accommodated in one receptacle 7 and the second piezoelectric actuator 5b is accommodated in the other receptacle 7. The receptacles 7 are not closed along their circumferences. Accordingly, a gap is formed on each end of the elastic frame 4 between the respective thin portion, on which a friction element 6 is arranged, and the lower portion of the elastic frame 4. In this embodiment, a set screw 9 is provided at each end of the elastic frame 4 so as to adjust the size of the respective gap, thereby pressing the thin portion of the elastic frame 4 against the respective piezoelectric actuator 5a, 5b.

Furthermore, an opening 8 of the elastic frame 4 is provided between the receptacles 7 in the longitudinal direction of the elastic frame 4. The portions of the elastic frame 4, which are located between the receptacles 7 and the opening 8 are configured as flexure hinges. In addition, two friction elements 6 having a triangular shape are arranged on the side of the elastic frame 4 facing the element to be driven 2. In particular, the wedge-shaped friction elements 6 are arranged such that their tips are located on vertical lines passing through the portions of the elastic frame 4 constituting the flexure hinges, wherein one leg of each friction element 6 connects to the elastic frame 4, wherein two respective parallel legs/faces of both triangular and wedge-shaped friction elements 6 face each other and wherein the respective hypotenuse of the triangular and wedge-shaped friction elements 6 faces away from each other and from the elastic frame 4 towards the element to be driven 2. The first and second piezoelectric actuators 5a and 5b are arranged symmetrically with respect to a symmetry plane of the stator 3 passing along a vertical center line of the elastic frame 4.

Figure 6A:
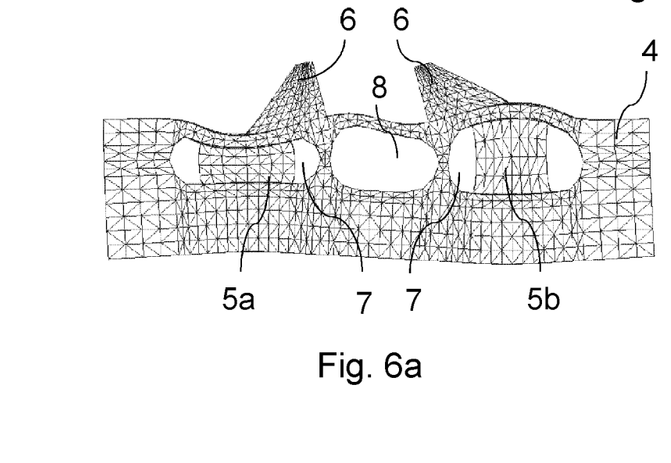
FIGS. 6a and 6b show calculated maximum deformation states of the elastic frame of the inertia drive motor according to the second embodiment upon excitation of the piezoelectric actuators.
Figure 6B:
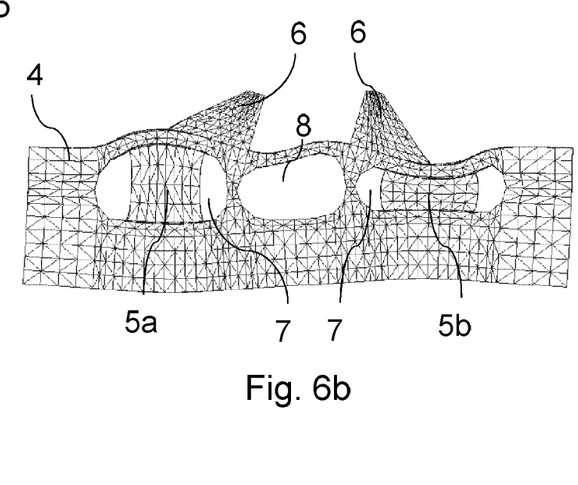

FIGS. 6a and 6b illustrate deformations of the elastic frame 4 occurring during the afore-mentioned excitation of the first and second piezoelectric actuators 5a and 5b with the excitation voltage signals V1 and V2 or V3 and V4. In this embodiment, during the stick phase, the tips of both friction elements 6 are simultaneously displaced in the moving direction of the element to be driven 2, so as to commonly push the element to be driven 2 in the moving direction by frictional contact with the friction surface of the element to be driven 2. During the slip phase, the tips of both friction elements 6 simultaneously slip along the friction surface of the element to be driven 2 in the direction opposite to the moving direction of the element to be driven 2 without moving the element to be driven 2.

Figure 7:
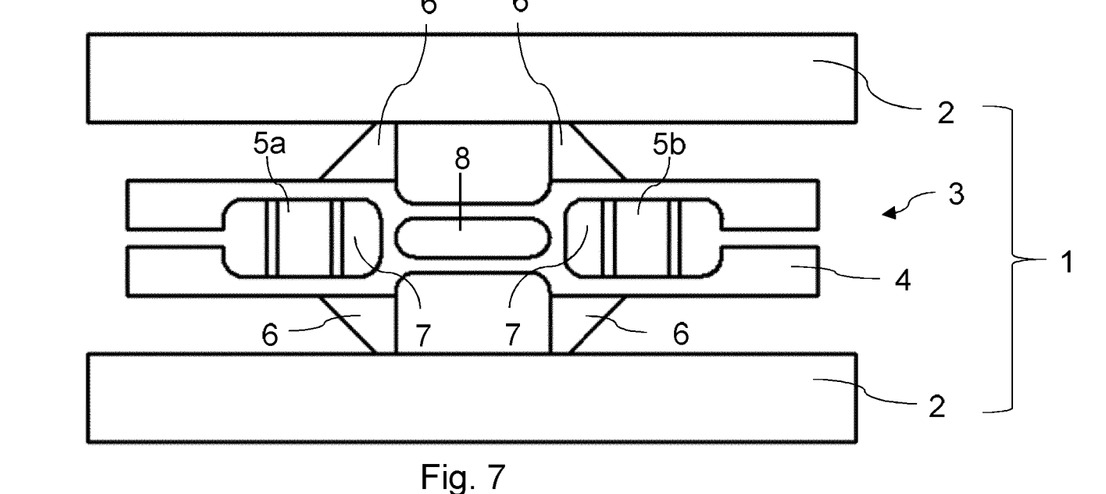
FIG. 7 shows an inertia drive motor according to a third embodiment of the present invention, wherein the stator has four friction elements in total wherein two friction elements respectively are provided on the same side of the stator.

A third embodiment of the inertia drive motor is shown in FIG. 7. In contrast to the second embodiment, the third embodiment of the inertia drive motor 1 is provided with two elements to be driven 2 arranged on opposite sides of the stator 3. Accordingly, the stator 3 is provided with two friction elements 6 arranged on the first and upper side of the elastic frame 4 facing the upper element to be driven 2 and two friction elements 6 arranged on the second and lower side of the elastic frame 4 facing the lower element to be driven 2. The inertia drive motor 1 according to the third embodiment is configured symmetrically with respect to a vertical and horizontal center line of the elastic frame 4. The set screws 9 are not illustrated in FIG. 7. However, it goes without saying that said set screws 9 can be likewise applied to this and further embodiments of the inertia drive motor 1.

Figure 8A:
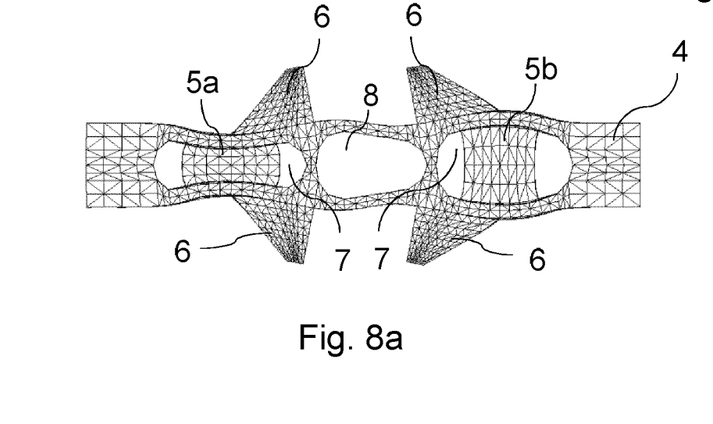
FIGS. 8a and 8b show calculated maximum deformation states of the elastic frame of the inertia drive motor according to the third embodiment upon excitation of the piezoelectric actuators.
Figure 8B:
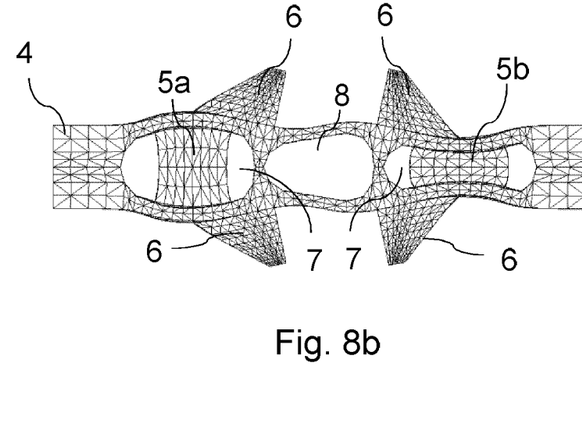

FIGS. 8a and 8b illustrate deformations of the elastic frame 4 occurring during the excitation of the first and second piezoelectric actuators 5a and 5b with the excitation voltage signals V1 and V2 or V3 and V4. In this embodiment, during the stick phase, the tips of all four friction elements 6 are simultaneously displaced in the moving direction of the elements to be driven 2. Thus, the two friction elements 6 arranged on the first and upper side of the elastic frame 4 commonly push the upper element to be driven 2 in the moving direction and the two friction elements 6 arranged on the second and lower side of the elastic frame 4 commonly push the lower element to be driven 2 in the moving direction. During the slip phase, the tips of all four friction elements 6 simultaneously slip along the friction surface of the respective element to be driven 2 in the direction opposite to the moving direction without moving the respective element to be driven 2.

Figure 9:
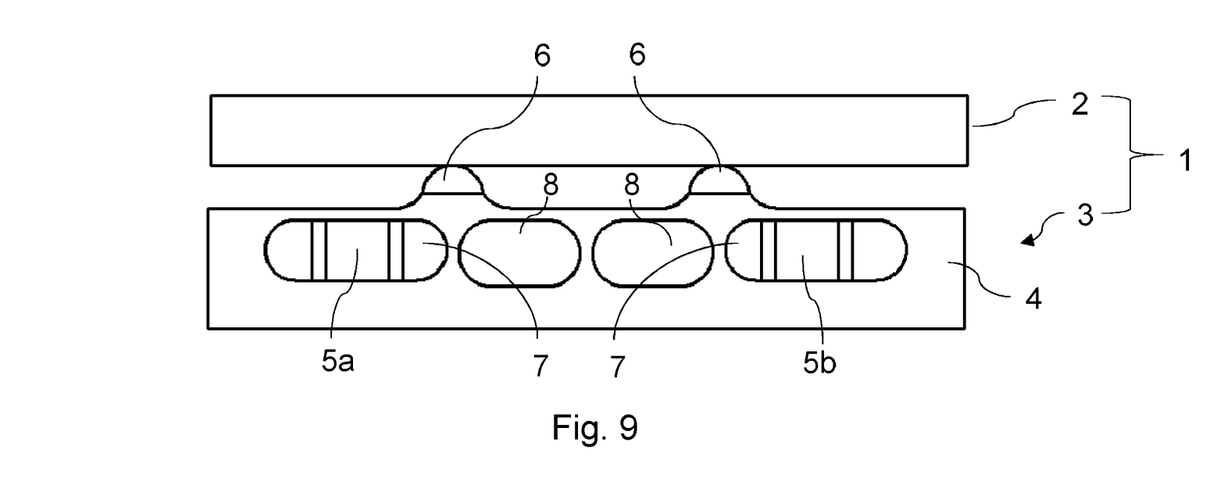
FIG. 9 shows an inertia drive motor according to a fourth embodiment of the present invention, wherein the stator has two friction elements in total and the elastic frame comprises multiple openings between the receptacles receiving the actuators.

A fourth embodiment of the inertia drive motor 1 is shown in FIG. 9. The inertia drive motor 1 according to the fourth embodiment provides an elastic frame 4 having two openings 8 arranged adjacent in the longitudinal direction between the receptacles 7. Accordingly, one center portion configured as flexure hinge is formed in the elastic frame 4 between the openings 8. Furthermore, two eccentric portions configured as flexure hinges are formed in the elastic frame 4 between one opening 8 and the adjacent receptacle 7. Two half-spherical friction elements 6 are arranged on the upper side of the elastic frame 4. Each friction element is arranged on a vertical line passing through one of the eccentric portions configured as flexure hinges. The inertia drive motor 1 according to the fourth embodiment is configured symmetrically with respect to a stator plane passing through the center portion configured as flexure hinge.

Figure 10A:
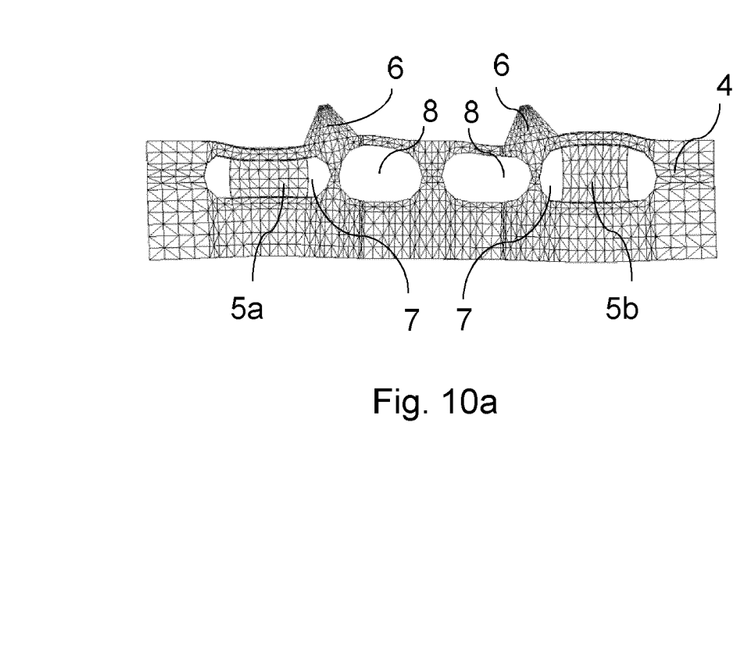
FIGS. 10a and 10b show calculated maximum deformation states of the elastic frame of the inertia drive motor according to the fourth embodiment upon excitation of the piezoelectric actuators.
Figure 10B:
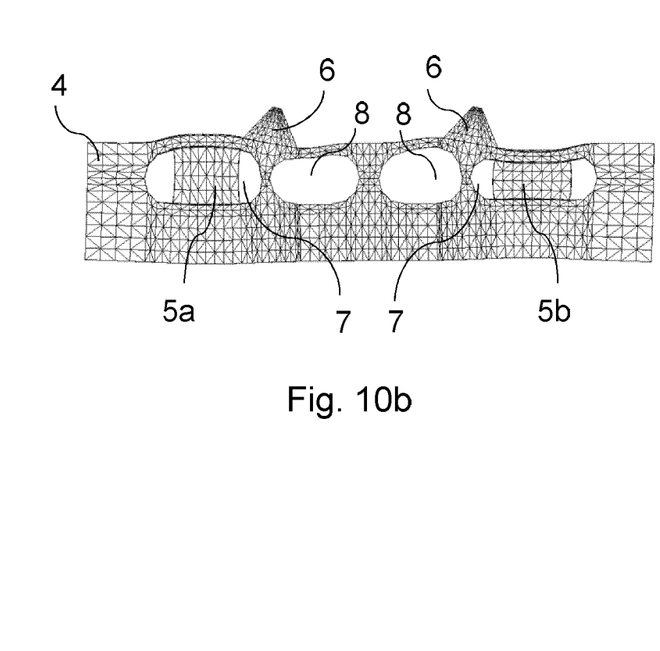

FIGS. 10a and 10b illustrate deformations of the elastic frame 4 occurring during the excitation of the first and second piezoelectric actuators 5a and 5b with the excitation voltage signals V1 and V2 or V3 and V4. The conditions during the stick and slip phase correspond to the conditions described in the second embodiment.

Figure 11:
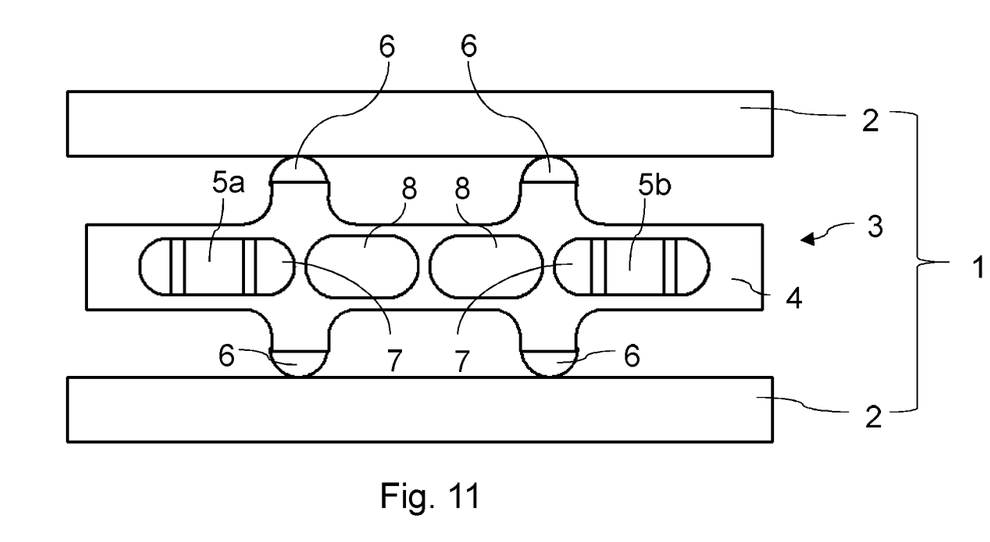
FIG. 11 shows an inertia drive motor according to a fifth embodiment of the present invention, wherein the stator has four friction elements in total and two friction elements respectively being arranged on the same side of the stator, wherein the elastic frame has multiple openings between the receptacles receiving the actuators.

A fifth embodiment of the inertia drive motor 1 is shown in FIG. 11. In contrast to the fourth embodiment and similar to the third embodiment, the fifth embodiment of the inertia drive motor 1 is provided with four friction elements 6 and two elements to be driven 2 arranged on opposite sides of the stator 3. The inertia drive motor 1 according to the fifth embodiment is configured symmetrically with respect to a horizontal and vertical center line of the elastic frame 4.

Figure 12A:
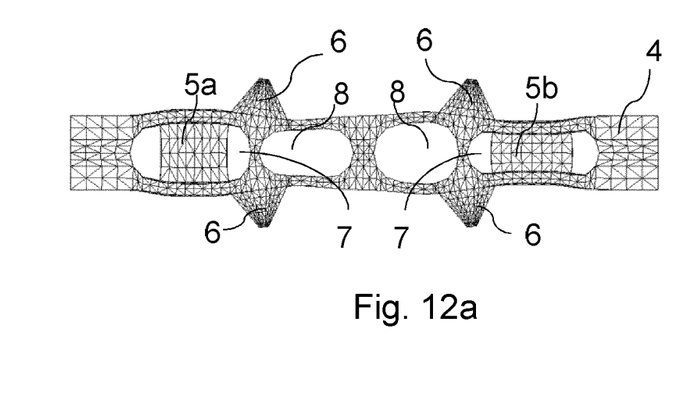
FIGS. 12a and 12b show calculated maximum deformation states of the elastic frame of the inertia drive motor according to the fifth embodiment upon excitation of the piezoelectric actuators.
Figure 12B:
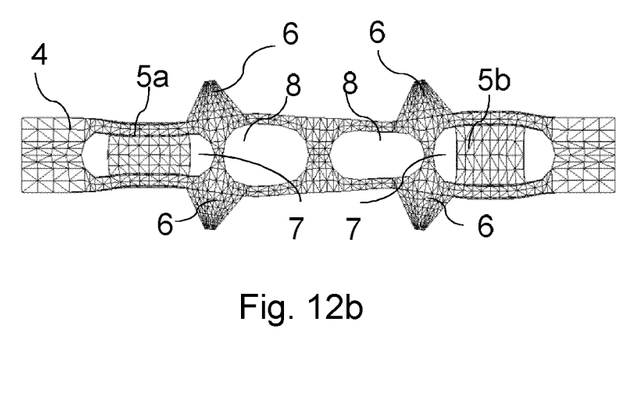

FIGS. 12a and 12b illustrate deformations of the elastic frame 4 occurring during the excitation of the first and second piezoelectric actuators 5a and 5b with the excitation voltage signals V1 and V2 or V3 and V4. The conditions during the stick and slip phase correspond to the conditions described in the third embodiment.

The inertia drive motors 1 according to the first to fifth embodiment differ in their dynamical properties. Depending on the requirements, a suitable embodiment may be chosen.

LIST OF REFERENCE SIGNS

1 inertia drive motor
2 element to be driven
3 stator
4 elastic frame
5a first electromechanical actuator
5b second electromechanical actuator
6 friction element
7 receptacle
8 opening
9 set screw
10 plate spring

The invention claimed is:

1. An inertia drive motor, comprising:
an element to be driven; and
a stator, the stator including:
an elastic frame,
at least one friction element arranged on the elastic frame and configured to be brought into frictional contact with the element to be driven, and
a first electromechanical actuator and a second electromechanical actuator, which are configured to cause, by interaction, a deformation of the elastic frame, upon excitation with different excitation voltages having different sawtooth signals, so as to displace the at least one friction element for driving the element to be driven by stick-slip contact with said friction element.

2. The inertia drive motor according to claim 1, wherein the first electromechanical actuator and the second electromechanical actuator are identical to each other in structure and/or polarization and/or orientation.

3. The inertia drive motor according to claim 1, wherein the first electromechanical actuator and the second electromechanical actuator are configured to expand and contract along parallel vibration paths, which are perpendicular to a moving direction of the element to be driven.

4. The inertia drive motor according to claim 1, wherein the at least one friction element is provided on a portion of the elastic frame, which is configured to incline with respect to a moving direction of the element to be driven upon excitation of the first electromechanical actuator and the second electromechanical actuator.

5. The inertia drive motor according to claim 1, wherein a side of the elastic frame facing the element to be driven corresponds to a first side of the elastic frame and an opposite side of the elastic frame facing away from the element to be driven corresponds to a second side of the elastic frame, wherein two friction elements are arranged on the first side of the elastic frame, or wherein, in case another element to be driven is provided on the second side of the elastic frame, a same number of friction elements is arranged on each of the first side and the second side of the elastic frame, wherein one or two friction elements are arranged on each of the first side and the second side of the elastic frame.

6. The inertia drive motor according to claim 1, wherein the first electromechanical actuator and the second electromechanical actuator are provided symmetrically with respect to a stator symmetry plane running through the at least one friction element, or passing in between two friction elements.

7. The inertia drive motor according to claim 1, wherein the elastic frame comprises:
at least one for more set screws, which are respectively configured to adjust pretension of the first electromechanical actuator and the second electromechanical actuator against a portion of the elastic frame provided with the friction element.

8. The inertia drive motor according to claim 1, wherein the at least one friction element is located between the first electromechanical actuator and the second electromechanical actuator along a moving direction of the element to be driven.

9. The inertia drive motor according to claim 1, comprising: a control device, which is configured to generate excitation voltage signals of the first electromechanical actuator and the second electromechanical actuator for driving the element to be driven by stick-slip contact with the friction element.

10. The inertia drive motor according to claim 1, wherein the elastic frame comprises:
a first receptacle, in which the first electromechanical actuator is accommodated, and a second receptacle, in which the second electromechanical actuator is accommodated, wherein both the first and second receptacles are open to a same side of the elastic frame, wherein said same side is different from a side facing the element to be driven and different from a side facing away from the element to be driven.

11. The inertia drive motor according to claim 10, wherein the elastic frame comprises:
at least one opening between the first receptacle and the second receptacle and/or the friction element, wherein portions of the elastic frame surrounding the at least one opening are configured as flexure hinges.

12. The inertia drive motor according to claim 1, comprising:
an excitation voltage control device configured to apply a first excitation voltage signal to the first electromechanical actuator and a second excitation voltage signal to the second electromechanical actuator, wherein the first excitation voltage signal and the second excitation voltage signal are mirrored to each other.

13. The inertia drive motor according to claim 12, wherein the excitation voltage control device is configured such that the first excitation voltage signal will have its maximum voltage level at a time at which the second excitation voltage signal has its minimum voltage level and/or wherein the first excitation voltage signal will have its minimum voltage level at a time at which the second excitation voltage signal has its maximum voltage level.

14. The inertia drive motor according to claim 12, wherein the excitation voltage control device is configured such that a decrease of the second excitation voltage signal between its maximum voltage level and its minimum voltage level is a negative gradient of an increase of the first excitation voltage signal between its minimum voltage level and its maximum voltage level and/or wherein a decrease of the first excitation voltage signal between its maximum voltage level and its minimum voltage level is a negative gradient of an increase of the second excitation voltage signal between its minimum voltage level and its maximum voltage level.

15. The inertia drive motor according to claim 14, wherein the excitation voltage control device is configured such that the first excitation voltage signal will have its maximum voltage level at a time at which the second excitation voltage signal has its minimum voltage level and/or wherein the first excitation voltage signal will have its minimum voltage level at a time at which the second excitation voltage signal has its maximum voltage level.

16. The inertia drive motor according to claim 15, wherein the first electromechanical actuator and the second electromechanical actuator are identical to each other in structure and/or polarization and/or orientation.

17. The inertia drive motor according to claim 16, wherein the first electromechanical actuator and the second electromechanical actuator are configured to expand and contract along parallel vibration paths, which are perpendicular to a moving direction of the element to be driven.

18. The inertia drive motor according to claim 17, wherein the at least one friction element is provided on a portion of the elastic frame, which is configured to incline with respect to a moving direction of the element to be driven upon excitation of the first electromechanical actuator and the second electromechanical actuator.

19. A method for controlling an inertia drive motor, the method comprising:
actuating first and second electromechanical actuators to interact, upon excitation with different excitation voltages having different sawtooth signals, in order to cause deformation of an elastic frame, so as to displace at least one friction element for driving an element to be driven by stick-slip contact with said at least one friction element.

20. The method according to claim 19, wherein the different excitation voltages having different sawtooth signals applied to the first and second electromechanical actuators are mirrored to each other.

* * * * *